(12) United States Patent
Meckstroth

(10) Patent No.: US 8,852,042 B2
(45) Date of Patent: Oct. 7, 2014

(54) FLATWIRE RADIAL ASYMMETRIC DAMPING BY COIL REACTION PATH

(75) Inventor: Richard John Meckstroth, Vonore, TN (US)

(73) Assignee: Dayco IP Holdings, LLC, Tulsa, OK (US)

(*) Notice: Subject to any disclaimer, the term of this patent is extended or adjusted under 35 U.S.C. 154(b) by 411 days.

(21) Appl. No.: 13/251,565

(22) Filed: Oct. 3, 2011

(65) Prior Publication Data
US 2013/0085027 A1 Apr. 4, 2013

(51) Int. Cl.
*F16H 7/12* (2006.01)
*F16H 7/08* (2006.01)

(52) U.S. Cl.
CPC ........ *F16H 7/1218* (2013.01); *F16H 2007/084* (2013.01); *F16H 2007/081* (2013.01); *F16H 2007/0893* (2013.01)

USPC ............................................ 474/135

(58) Field of Classification Search
CPC .................................................. F16H 2007/081
USPC ........................................ 474/114, 133, 135
See application file for complete search history.

(56) References Cited

U.S. PATENT DOCUMENTS

| | | | | |
|---|---|---|---|---|
| 5,328,415 | A | * | 7/1994 | Furutani et al. ............... 474/112 |
| 5,399,124 | A | * | 3/1995 | Yamamoto et al. ............ 474/94 |
| 6,231,465 | B1 | | 5/2001 | Quintus |
| 6,863,631 | B2 | | 3/2005 | Meckstroth et al. |
| 7,678,002 | B2 | | 3/2010 | Joslyn |
| 2003/0119616 | A1 | * | 6/2003 | Meckstroth et al. .......... 474/135 |

* cited by examiner

*Primary Examiner* — William E Dondero
*Assistant Examiner* — Diem Tran
(74) *Attorney, Agent, or Firm* — Thompson Hine L.L.P.

(57) ABSTRACT

What is described is an improved asymmetric damping apparatus which utilizes a flatwire spring to provide both bias in the tensioning direction for a belt tensioner and asymmetric damping against sudden rotational movement of the belt tensioner in the winding direction.

20 Claims, 11 Drawing Sheets

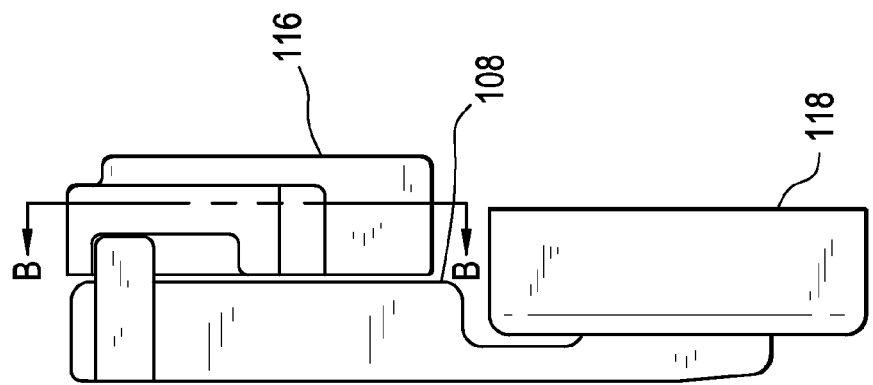
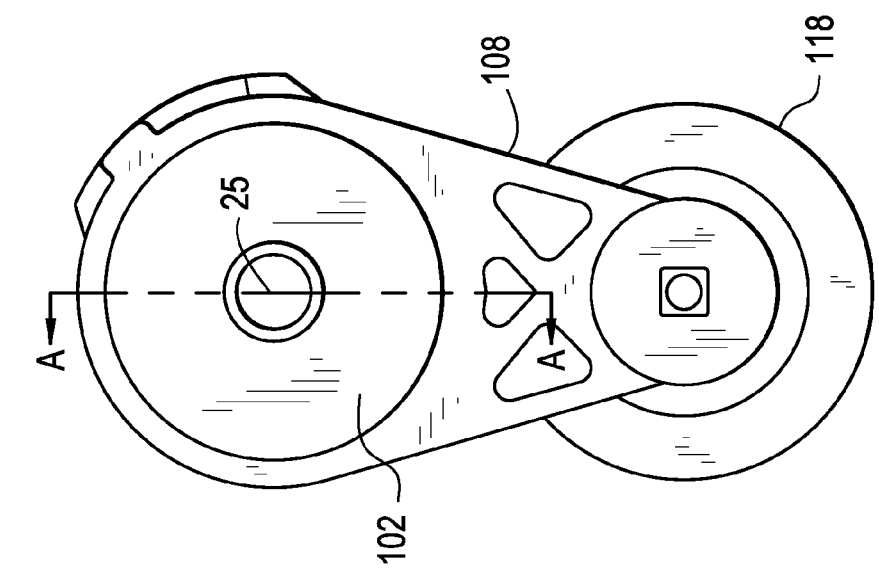

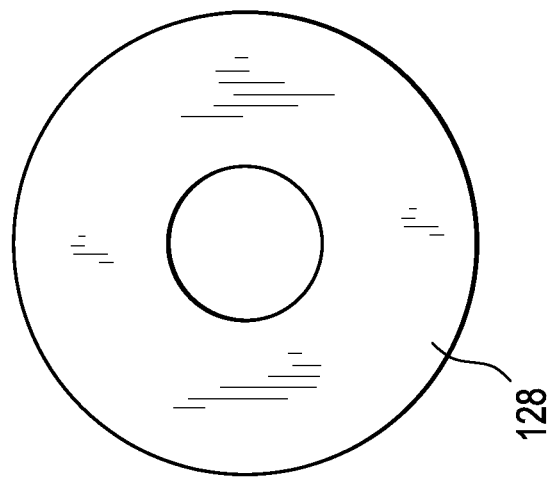
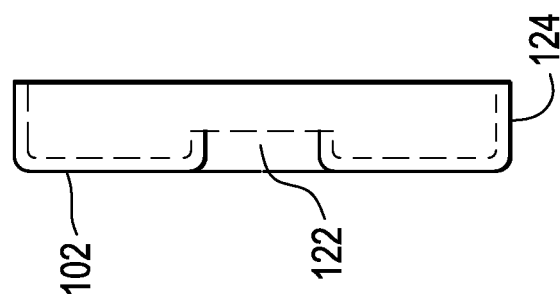
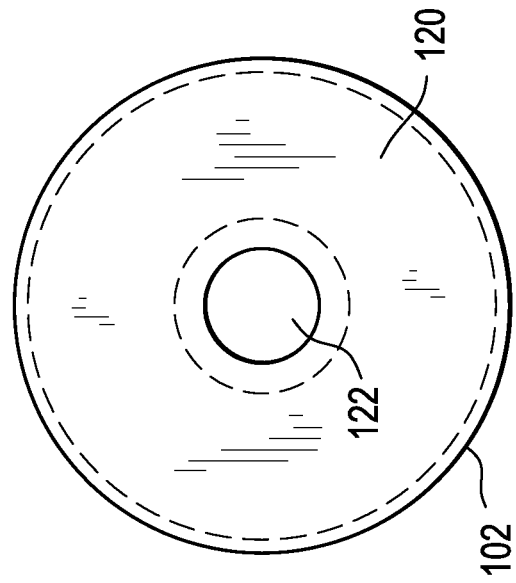

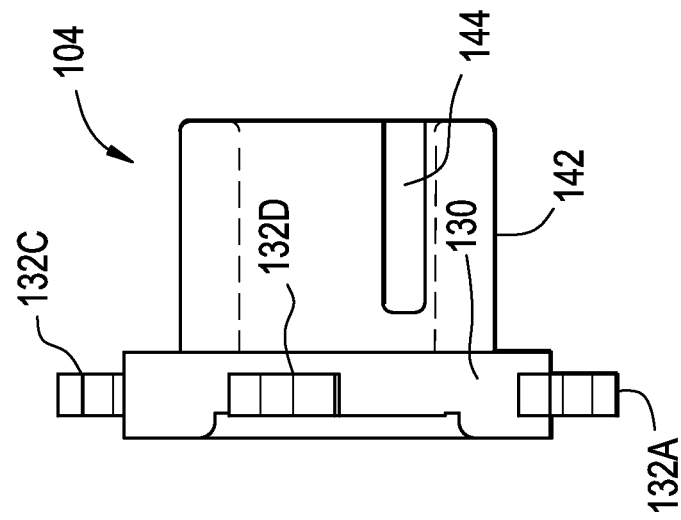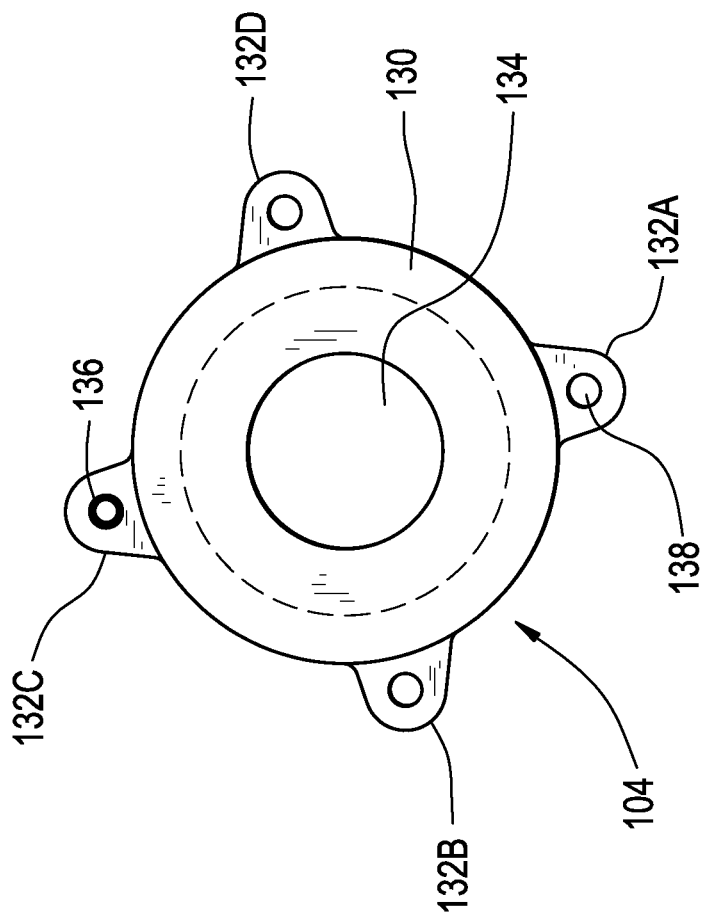

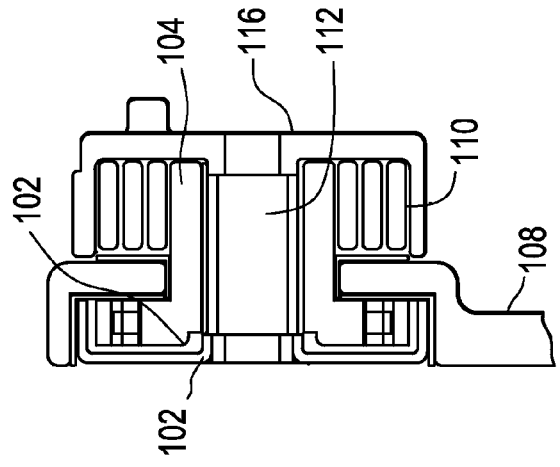
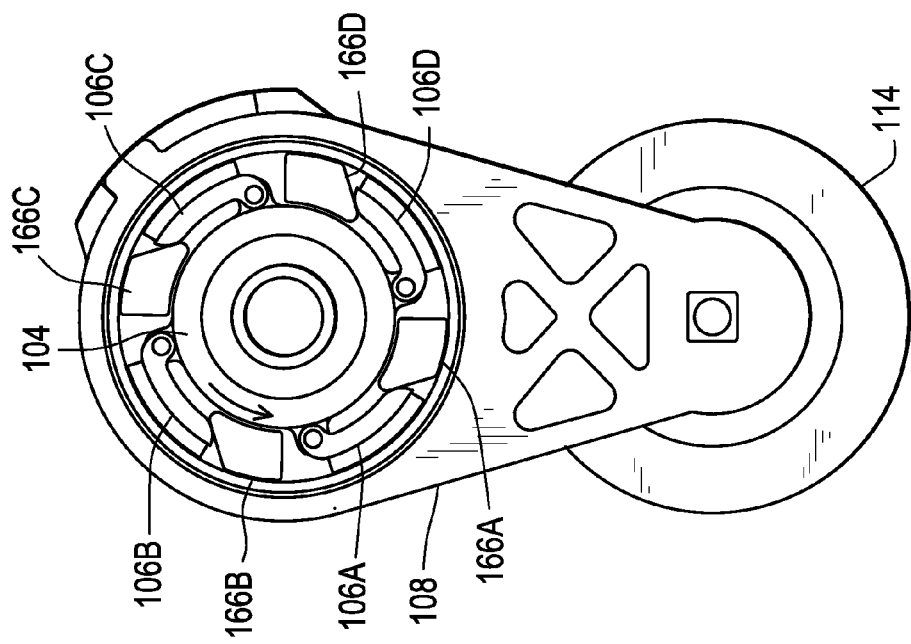

FLATWIRE RADIAL ASYMMETRIC DAMPING BY COIL REACTION PATH

TECHNICAL FIELD

The present invention relates to a belt tensioner having asymmetric damping. More particularly, the belt tensioner utilizes an expanding spring to provide radial friction-damping. The damping of the belt tensioner is created by the reaction force of a helically wound flat wire spring.

BACKGROUND

It is common for a tensioner such as a belt tensioner to have a means to dampen movement of the tensioner arm caused by belt tension fluctuation. The required magnitude of this damping depends on many drive factors including geometry, accessory loads, accessory inertia, engine duty cycle and others. For instance, drive systems that have higher torsional input or certain transient dynamic conditions may require higher damping to sufficiently control tensioner movement. Although higher damping is very effective at controlling arm movement, it can also be detrimental to other critical tensioner functions (e.g., slow or no response to slack belt conditions). In addition, variation or change in damping that occur as a result of manufacturing variation, operating temperature and component break-in or wear can also cause the tensioner to be unresponsive.

Timing belt systems have benefited from the use of asymmetric damping to address this problem. An asymmetrically damped tensioner provides damping when additional belt tension is encountered, but is free to respond to slack belt conditions. Although asymmetric functionality may not be required for all other front end accessory drive tensioners, the potential for increased service life, solving other transient dynamic system problems including belt slip, or simply making the tensioner less sensitive to damping variation make it a desirable design option.

Many belt tensioner damping mechanisms that utilize frictional damping use axial forces to move components of the tensioner to create the frictional force that does the damping. These designs tend to require a means to contain the axial force and some components of the belt tensioner must be more robust to withstand the axial force over the lifetime of the tensioner.

One example of axial damping is the use of a Bellville spring, disc spring, or wave washer acting perpendicular to a torsional spring. The disc spring forces surfaces together to create rotational friction, thereby damping movement of the belt tensioner. These springs are often limited by package space, and therefore may have inadequate damping magnitude. Alternatively, the damping magnitude may be sufficient, but extremely sensitive to spring preload, thereby requiring highly accurate dimensional tolerances to maintain the desired preload on rotating friction surfaces. Wear on the system caused by this rotational friction may therefore skew the axial damping force away from the preferred tolerance.

Another example of axial damping is the use of a coil spring providing damping force in additional to torsional biasing of the belt tensioner towards the belt. In addition to the problems described above with respect to the disc spring or Bellville spring, axial damping may exhibit varying damping depending on the position of the tensioner and amount of stress on the coiled spring due to the winding or tensioning rotation of the arm, and thus coil spring.

Tensioner damping that is unequal, or asymmetric, has been shown to provide superior control of tensioner arm movement compared to typical symmetrical systems. An asymmetrically damped tensioner provides damping when additional belt tension is encountered but is free to respond to slack belt conditions, thereby increasing resistance to undesirable tensioner movement and freely allowing desirable tensioner movement to maintain tension in the belt.

SUMMARY

The invention includes a tensioner which includes a pivot shaft, rotor, arm, spring, and damping assembly. The rotor is pivotally mounted on the pivot shaft and the arm is pivotally mounted on the rotor and can be rotated in a winding direction or a tensioning direction. The damping assembly generally consists of a reaction drum about the rotor and brake shoes connected to the rotor and in frictional contact with said reaction drum. Wedges positioned on the arm bias the brake shoe against the reaction drum when the arm is moved in the winding direction. This frictional contact creates a damping force against movement of the arm in the winding direction.

According to an alternative embodiment, a tensioner for an endless power transmitting element in a drive system is disclosed. The tensioner includes an arm, a rotor, a drum, and a torsional spring. The arm includes a wedge and the rotor includes a brake shoe in contact with the wedge. When the arm is moved by the spring towards the belt, the brake shoes apply a force against the reaction drum which amounts to a first level of damping. However, when the arm is moved in a winding direction, the wedge biases the shoe against the drum to create a second, higher, level of damping of the movement of the arm, a desirable functional response to control arm vibration and proper belt dynamic constraint.

According to a final embodiment, a tensioner is described that includes an arm with a plurality of wedges, a rotor with a plurality of brake shoes in contact with the wedges, a drum in frictional engagement with the brake shoes, and a spring biasing the rotor in a tensioning direction. The brake shoes act against the wedges to bias the arm in the tensioning direction while when the arm is rotated in a winding direction, the wedges urge the brake shoes against the drum to increase friction which results in damping of movement of the arm.

BRIEF DESCRIPTION OF DRAWINGS

FIG. 2A is a top plan view of the tensioner of FIG. 1.
FIG. 2B is a side plan view of the tensioner of FIG. 1.
FIG. 4A is a top plan view of a stationary reaction drum.
FIG. 4B is a side plan view of the stationary reaction drum of FIG. 4A.
FIG. 4C is a top plan view of a reaction drum bearing.
FIG. 5A is a top plan view of an arm rotor.
FIG. 5B is a side plan view of the arm rotor of FIG. 5A.

FIG. 11A is a front cutaway view taken along line B-B in FIG. 2B.

FIG. 11B is a side cutaway view taken along line A-A in FIG. 2A.

DETAILED DESCRIPTION

Figure 1:
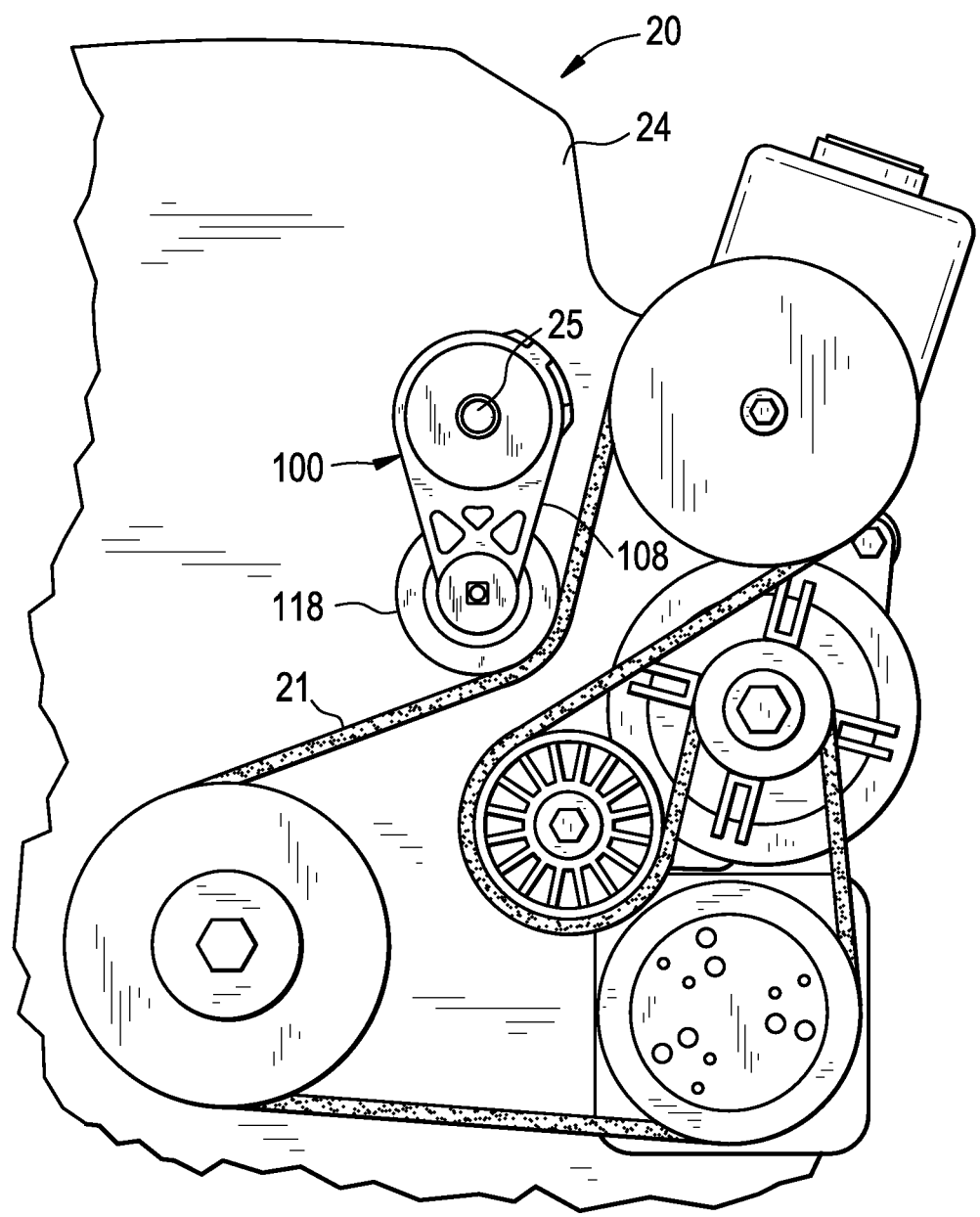
FIG. 1 is a perspective view of a tensioner and engine assembly.

The following detailed description will illustrate the general principles of the invention, example of which are additionally illustrated in the accompanying drawings. In the drawings, like reference numbers indicate identical or functionally similar elements.

The damping mechanism and tensioner disclosed herein provide the tensioner with asymmetric frictional damping. The tensioner is typically part of a power system where the tensioner provides tension to an endless power transmitting element such as a belt, chain, or other continuous loop in a system driven by at least one source and that also drives at least one accessory. The endless power transmitting element and the tensioner operate in concert with the tensioner providing tension to the power transmitting element as needed and responding to dynamic conditions thereof.

Referring now to FIG. 1, an engine is generally indicated by the reference numeral 20 and utilizes an endless power transmitting element 21 for driving a plurality of driven accessories as is well known in the art. The belt tensioner of this invention, generally designated as 100, is utilized to provide a tensioning force on the endless power transmitting element 21 in the manner described below. The endless power transmission belt 21 may be of any suitable type known in the art. The tensioner 100 is configured to be fixed to a mounting bracket or support structure 24 of the engine 20 by one or more fasteners 25. The fasteners may be bolts, screws, welds, or any other suitable fastener known in the art that will hold the tensioner in place during operation of the engine. The mounting bracket or supporting structure 24 may be of any configuration and include any number of openings for receiving the fasteners 25.

Tensioning of the power transmitting element is accomplished through unwinding of a wound-up tensioner which will be referred to herein as the tensioning direction T. In the opposite direction, referred to herein as the winding direction W, a winding up of the tensioner occurs in response to a prevailing force of the power transmitting element which is tightening in the span where the tensioner resides. Sudden or rapid winding of the tensioner may have some potentially deleterious effects, so to mitigate these effects it is desirable to have a damper, for example a frictional damper, incorporated in the tensioner to resist the movement of the power transmitting element without adversely affecting movement of the tensioner, in particular its arm to tension the power transmitting element. This kind of frictional damping is generally known as asymmetric damping.

The damping mechanism and belt tensioner disclosed herein achieves asymmetric damping in part by using a brake element in concert with a torsional spring, which may be referred to herein as a torsional brake assembly. The torsional brake assembly provides radially outwardly directed force that creates radial frictional damping between components of the damping mechanism and/or belt tensioner.

The torsional brake assembly 100 is generally shown in FIGS. 2A and 2B. These figures show that the exterior of the assembly generally consists of a reaction drum 102, arm 108, pulley 114, and spring case 116 which is secured to the supporting structure 24 by means of a fastener 25 (FIG. 1).

Figure 3:
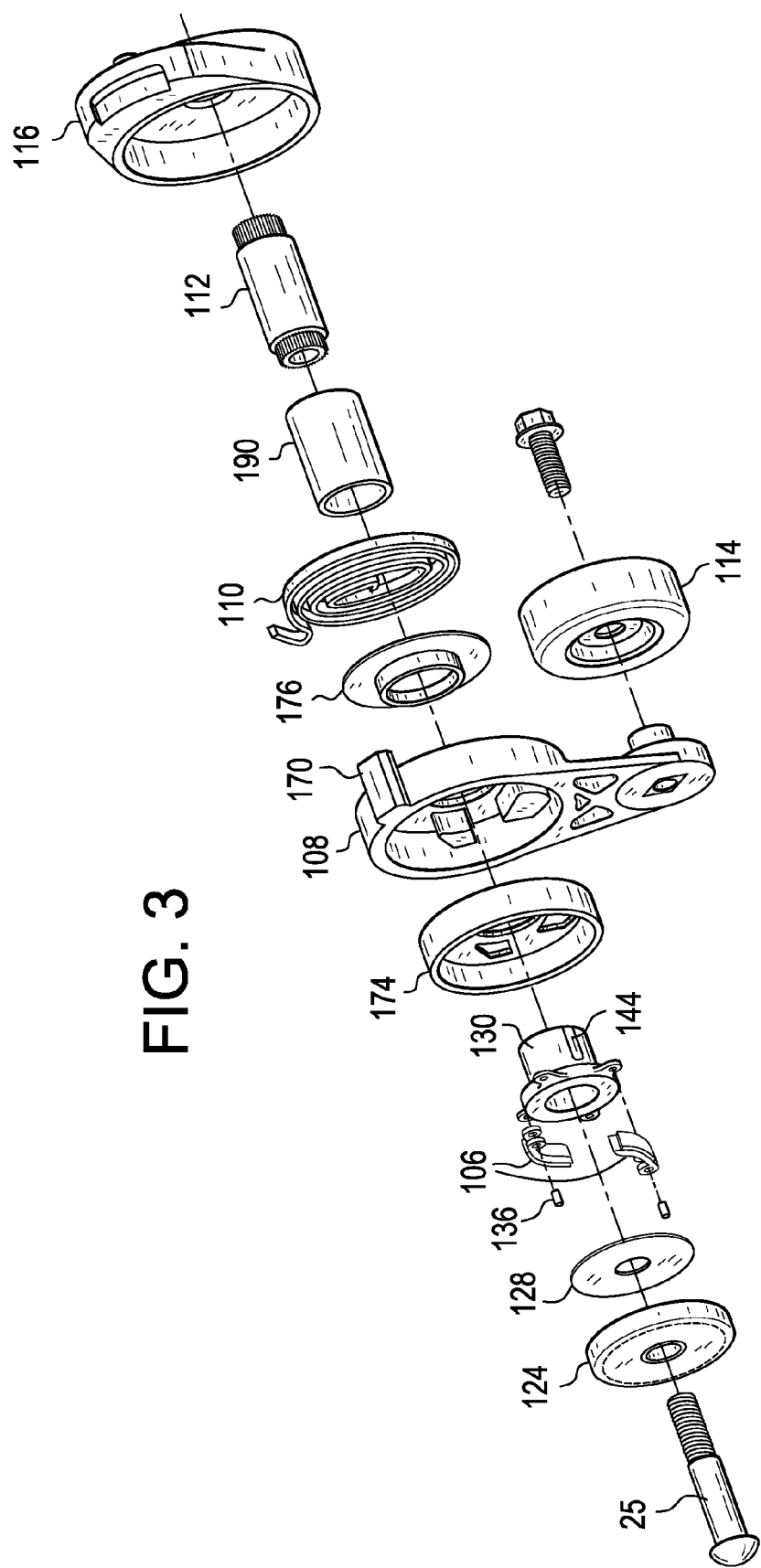
FIG. 3 is an exploded perspective view of the tensioner of FIG. 1.

As shown in the exploded assembly of FIG. 3, the belt tensioner 100 may generally consist of a reaction drum 102, an arm rotor 104 having a number of brake shoes 106, an arm 108, a torsional spring 110, a pivot tube 112, a spring case 116 and a pulley 114. The arm 108 generally consists of a first portion 162 and a second portion 164. The reaction drum 102, arm rotor 104, torsional spring 110, pivot tube 112, and spring case 116 are all combined at the first portion 162 of the arm 108 while the pulley 114 is attached to the opposite, second portion 164, of the arm 108.

Figure 9A:
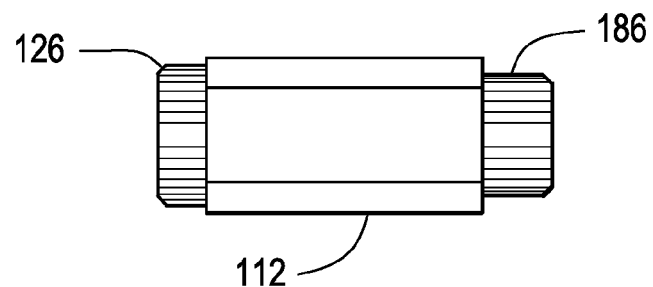
FIG. 9A is a side view of a pivot tube.

FIGS. 4A and B show the reaction drum 102 in further detail. The reaction drum 102 has a cup-shaped form and is provided with a lip 124 extending axially outwardly from a bottom 120 which includes a central opening 122. The central opening 122 is adapted to receive a first splined end 126 of the pivot tube 112 (FIG. 9A, discussed below), or otherwise have geometry corresponding to attachment structure of the pivot tube 112 (FIG. 9A). The inside of the lip 124 of the reaction drum provides the surface against which the brake shoes 106 (FIG. 6A) act, and therefore is sized appropriately to accommodate the brake shoes 106 (FIG. 6A, discussed below) and may include a material suitable to increase frictional damping between the brake shoes 106 and lip 124. As shown in FIG. 4B, the central opening 122 may include a secondary lip. This may be required to provide complimentary geometry to the pivot tube 112 or engage the arm rotor 104.

FIG. 4C shows a reaction drum front bearing washer 128 which may be mounted flush to the bottom of the cup 120 of the reaction drum 102 in order to reduce friction between the reaction drum 102 and the brake shoes 106. This bearing may be nylon or any suitable material to reduce friction between the reaction drum 102 and arm rotor 104.

Figure 7A:
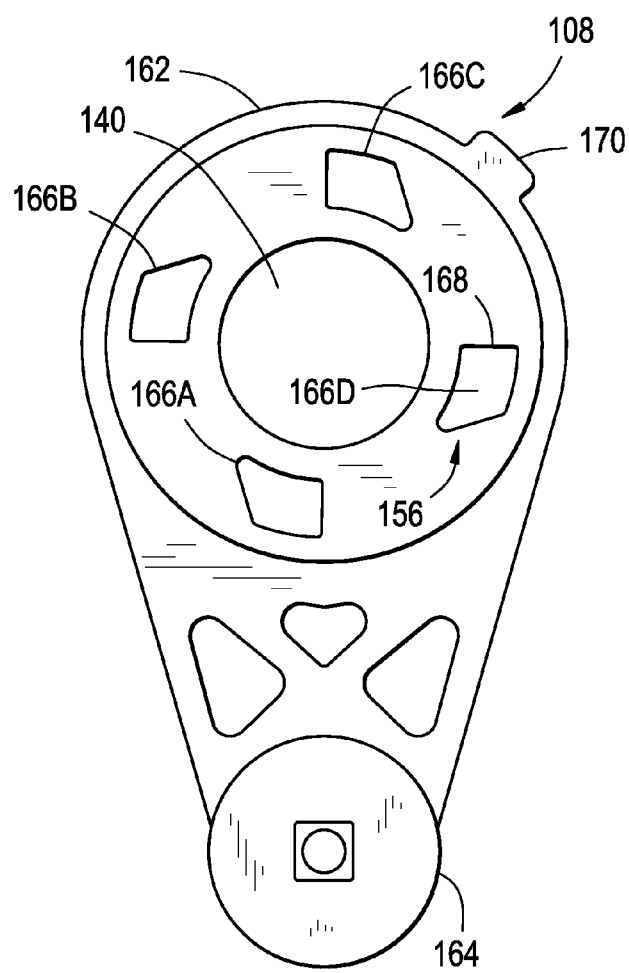
FIG. 7A is a top plan view of an arm.
Figure 8:
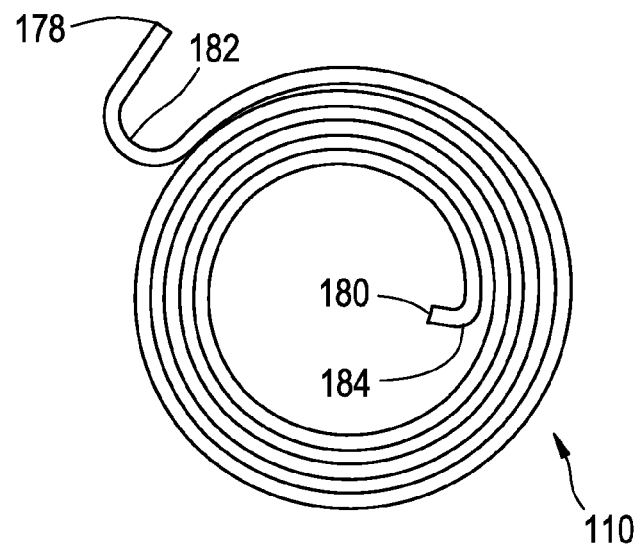
FIG. 8 is a top plan view of a torsional spring.

FIGS. 5A-B show the arm rotor 104 in further detail. The arm rotor 104 includes consist of a circular frame 130 with one or more mounting protrusions 132 extending radially from the perimeter of the circular frame 130. These protrusions 132 may each include an opening 138 sized to receive a pin 136 (FIG. 3) for attaching the brake shoes 106 (FIGS. 6A-B) to the arm rotor 104. Frame 130 has a central bore 134 sized to receive the pivot tube 112 (FIG. 9A) and is concentric with the opening 140 of the arm 108 (FIG. 7A). Extending away from and normal to the circular frame 130 about the perimeter of the bore 134 is a hub 142, best seen in FIG. 5B, which fits within the central opening 140 of the arm 108 (FIG. 7A). Extending axially along the hub 142 may be a slot 144 that is sized and positioned so as to receive spring end 178 (FIG. 8).

Figure 6A:
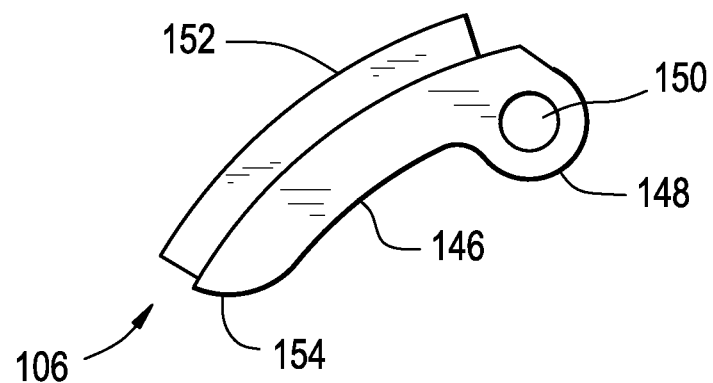
FIG. 6A is a top plan view of a brake shoe.
Figure 6B:
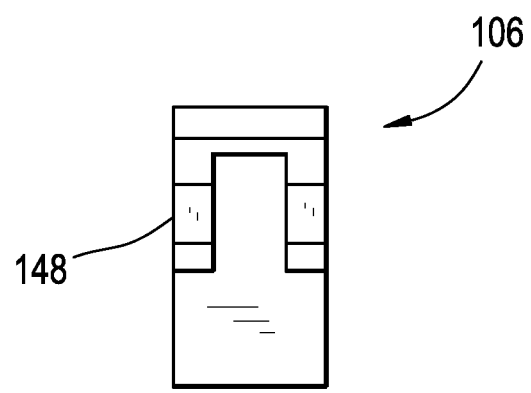
FIG. 6B is a side plan view of the brake shoe of FIG. 6A.

Referring to FIGS. 6A-B, brake shoe 106 is pivotally attachable to a mounting protrusion 132 of the arm rotor 104 (FIG. 5A). The brake shoe 106 consists of a cantilevered arm 146 including mounting structure 148 for securing the brake shoe 106 to the mounting protrusion 132 of the arm rotor 104. As shown in FIG. 6B, this structure 148 may include a pair of spaced apart planes, each having a hole 150 for receiving pin 136. The mounting protrusion 132 of the arm rotor 104 (FIG. 5A) may be inserted between the two planes and pinned in place with the pin 136. While this is one method of attaching the brake shoes 106 to the arm rotor 104, other methods and structure may also be utilized.

Also included on the brake shoe 106 is an outer surface 152 which may be formed of or include a braking material. This outer surface 152 is shaped to generally conform to the inside of lip 124 of the reaction drum 102 (See. FIG. 4B). The brake surface is chosen to provide a variable braking force between the brake shoe 106 and the reaction drum 102 that is based on the normal force between the two surfaces.

The brake shoes 106 are elongate with mounting structure 148 on one end and a translating end 154 opposite thereof. This translating end 154 is sloped to generally conform to the wedging end 156 of the arm wedges 166 (FIG. 7A), so that as the arm wedges 166 are rotated relative to the arm rotor 104 (FIG. 5A) the brake shoes 106 are forced outward to impact the reaction drum 102 (FIG. 4A). The translating end 154 and wedging end 156 may have similar angles, different angles, or the translating end 154 or wedging end 156 may have a nonlinear surface. The relationship between the translating end 154 and wedging end 156 are chosen according to the needs to which the invention is applied. For example, if the total travel distance of the arm 108 (FIG. 7A) is low, then it would be desirable to have a steep slope to the wedging end 156 (FIG. 7A) so that a shorter travel distance is required to achieve maximum braking Alternatively, if the total travel distance of the arm 108 is high, then it is desirable to have a shallow slope on the wedging end 156 so that damping of the arm 108 is lessened. Further, it may be desirous to include a non-linear normal force between the brake shoe 106 and the reaction drum 102, and the surfaces may be curved or have non-uniform sloping.

The translating end 154 and wedging end 156 may be coated or otherwise treated in order to minimize the feature-to-feature interface friction. Specific methods of achieving this goal can include coating one or more of the surfaces with a number of different materials including metallic, ceramic, and/or plastic materials, including but not limited to brass, aluminum, oil impregnated bronze, silicon nitride, Teflon® (polytetrafluoroethylene—PTFE), ultra high molecular weight polyethylene (UH-MWP), or a high density polyethylene. These materials may either form the entire feature as one unit or be applied to a substrate or structural materials in order to achieve specific load bearing and friction characteristics.

Figure 7B:
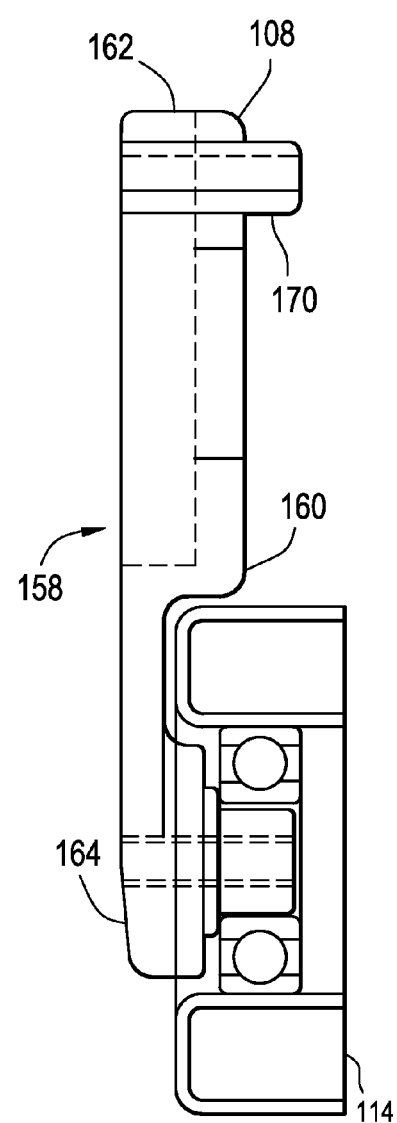
FIG. 7B is a side plan view of the arm of FIG. 7A.

Referring to FIGS. 7A-B, the arm 108 includes a first face 158 and a second face 160 opposite one another. The second face 160 is adapted to receive the pulley 114 and the first face 158 includes wedges 166 as described below. The arm 108 further includes first 162 and second 164 portions opposite one another, where the arm 108 rotates about an axis defined by the pivot tube 112 and the pulley 114 is attached to the second portion 164. The first portion 162 also may include a central opening 140 so that the arm 108 may be placed over the hub 142 of the arm rotor 104 (FIG. 5B).

Positioned about the central opening 140 of the arm 108 and extending away from the first face 158 of the arm 108 may be a number of arm wedges 166. These arm wedges 166 may be in radial symmetry about the central opening 140. As shown in FIG. 7A, each arm wedge 166 includes a broad end 168 and a wedging end 156, and all of the wedging ends 156 may point in either the clockwise or counter-clockwise direction about the center opening 140 of the first portion 162 to create asymmetric damping. These wedges 166 may vary in shape and design as described above, and may further be arranged in alternating directions (clockwise, counter-clockwise) to create damping in both the tensioning T and winding W directions, as desired.

Also positioned on the arm 108 and shown in FIG. 7B is a stop 170 which extends beyond the second face 160 of the arm 108 and interfaces with the groove 172 (FIG. 10B) of the spring case 116 (FIG. 10A) to limit the range of motion of the arm 108 in the tensioning T or winding W directions. Also shown in this figure is the pulley 104 which may include a bearing or other structure to reduction friction. This pulley 104 is designed to freely rotate and is attached to the second face 160 at the second portion 164.

Figure 7C:
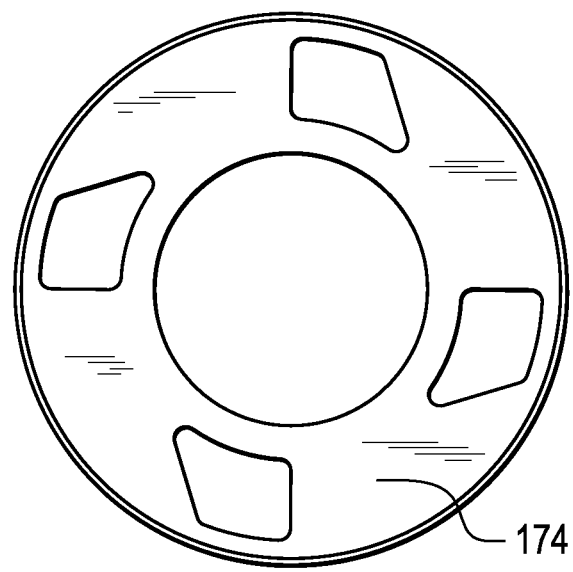
FIG. 7C is a top plan view of an arm bearing cup.

FIG. 7C shows an optional arm bearing cup 174 which may be positioned on the first face of the arm 108 to cover areas where the arm 108 and arm rotor 104 may come into contact to reduce frictional forces between the arm 108 (FIG. 7A) and arm rotor (FIG. 5A). This arm bearing cup 174 may be formed of nylon or other material selected to reduce friction between the arm rotor 104 and arm 108.

Figure 7D:
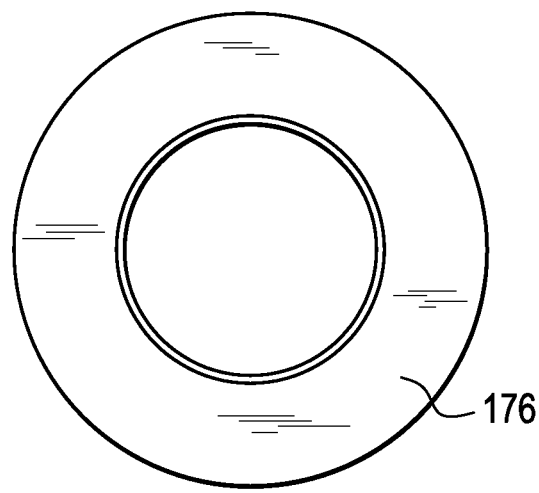
FIG. 7D is a top plan view of a hat bushing.

FIG. 7D shows an optional hat bushing 176 which may be placed between the arm 108 (FIG. 7A) and torsional spring 110 (FIG. 8) to reduce friction between these components.

FIG. 8 shows the torsional spring 110, which may be a flat wire torsion spring. The spring 110 generally has a first end 178 and a second end 180. Each end is bent to form a hook 182, 184 so that the spring may be attached to the arm spring case 116 (FIG. 10A) or arm rotor 104 (FIG. 5B), respectively. Alternatively, each end 178, 180 may include a rivet, sleeve, or other structure for mounting, either removably or fixedly, the spring to one of these components. These hooks 182, 184 or other mounting structure are arranged so that a rotational force in the winding direction W by the arm rotor 104 winds the spring and the unwinding force of the spring biases the arm rotor 104 in the tensioning direction T. The spring 110 may be formed of a round wire, flat wire, square wire, or any other wire geometry. Also, while the spring 110 is generally shown as a planar torsional spring, the spring 110 may be a helical torsional spring.

Figure 10A:
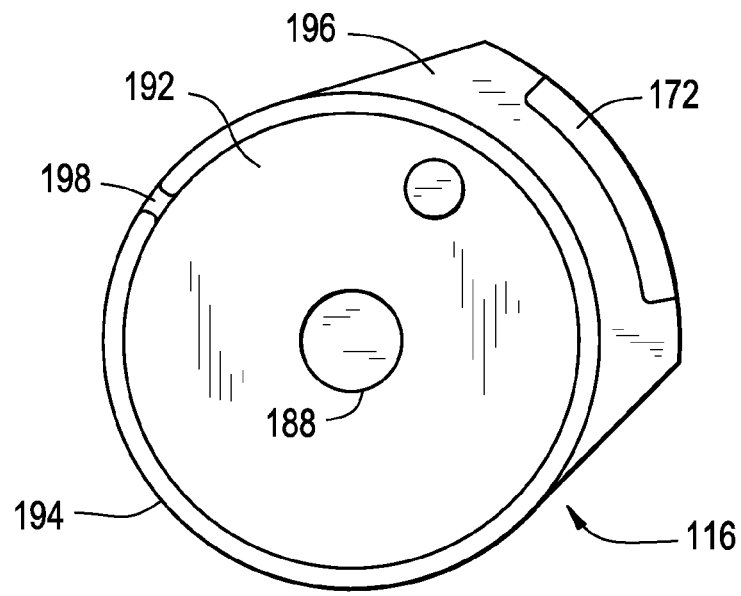
FIG. 10A is a top plan view of a spring case.

Referring to FIG. 9A, the pivot tube 112 is shown that serves as the central structure about which the arm rotor 104 rotates. The pivot tube 112 includes an elongated hollow tube, sized to receive a fastener 25 (FIG. 1), with a first splined end 126 and a second splined end 186. The first splined end 126 engages with the central opening 122 of the reaction drum 102 (FIG. 4A), while the second splined end 186 engages the central opening 188 of the spring casing 116 (FIG. 10A). The splined ends 126, 186 may have the same or different diameters and splines. The splines may instead be replaced with a Hirth joint or may be otherwise keyed or otherwise shaped so as to prevent rotation of the reaction drum 102 relative to the spring casing 116.

Figure 9B:
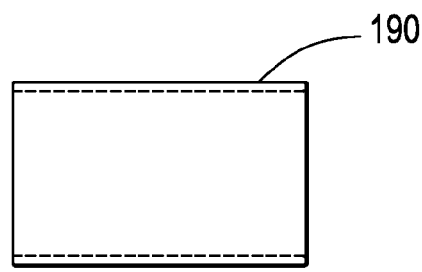
FIG. 9B is a side view of a pivot tube bearing.

FIG. 9B shows a bearing 190 made of either nylon or other low friction material so as to reduce friction between the pivot tube 112 (FIG. 9A) and arm rotor 104 (FIG. 5A).

Figure 10B:
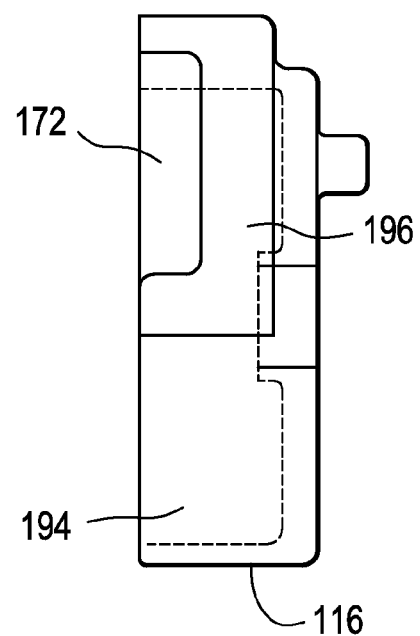
FIG. 10B is a side plan view of the spring case of FIG. 10A.

FIGS. 10A-B show the stationary spring case 116. The spring case 116 may be cup-shaped with a cylindrical wall 194 extending axially outwardly from a bottom 192 and including a central opening 188. About a portion of the cylindrical wall 194 is a stop protrusion 196 which extends radially outward from the cylindrical wall 194. The stop protrusion 196 also includes a groove 172 which interfaces with the stop 170 of the arm 108 (FIG. 7B) to limit the range of motion of the arm 108. Additionally positioned within the cylindrical wall 194 is a gap 198 that receives the first end 178 (FIG. 8) of the torsional spring 110. The central opening 188 may further include mounting geometry, such as a spline, corresponding to the second end 186 of the pivot tube 112 (FIG. 9A).

FIG. 11A shows the assembled belt tensioner 100 of FIG. 2A, taken along line B-B. In assembling the belt tensioner 100 to the supporting structure 24 (FIG. 1), the spring case 116 (FIG. 11B), reaction drum 102, and pivot tube 112 are rigidly attached to the support structure 24 so as to remain fixed in position as the arm 108 rotates relative thereto to maintain tension in the endless power transmission belt 21 (FIG. 1). Positioned and rotatable about the pivot tube 112 are the arm rotor 104 and the arm 108. Spring 110 is windable about the pivot tube 112 and secured at one end to the spring case 116 and at the other end to arm rotor 104. The arm rotor 104 further includes of a plurality of brake shoes 106 pivotally attached to the arm rotor 104. These brake shoes 106 abut the reaction drum 102 to cause a frictional damping between the reaction drum 102 and arm rotor 104, thereby resisting rotational motion of the arm rotor 104 as the reaction drum 102 is fixed relative to the stationary spring case 116 (FIG. 11B).

Referring to FIG. 11B, taken along line A-A of FIG. 2A, the various components described above are arranged radially about the pivot tube 112 and each component is nested relative to the next about the pivot tube 112.

Assembly of the belt tensioner is accomplished according to the following steps, with reference to FIG. 3, which shows an exploded view of the assembly. First, the spring case 116 and pivot tube 112 are assembled together, with the second end 186 of the pivot tube 112 inserted into the central opening 188 of the spring casing 116. Next, the spring 110 is positioned within the spring case 116, and arranged so that the first end 178 extends through the gap 198 in the spring case 116, and secured thereto by means of the hook 182 or other suitable mounting structure. The arm 108 is then placed over the spring 110 and pivot tube 112 with the wedges 166 facing outward from the assembly. The stop 170 of the arm 108 is positioned within the groove 172 of the stationary spring case 116, thereby limiting rotation of the arm 108 relative to the spring case 116. The brake shoes 106 are positioned on the arm rotor 104 and pinned in place with the pins 136 as described above. The arm rotor 104 is then positioned with the hub 142 within the central opening 140 of the arm 108 and about the pivot tube 112. The slot 144 is aligned with the second end 180 of the spring and secured by means of the hook 184 or other mounting means. The reaction drum 102 is then placed over the arm rotor 104 and brake shoes 106 and aligned with the first end 126 of the pivot tube 112. Pulley 114 is secured to the second portion 164 of the arm 108 by means of a bolt or other fastener. Finally, a fastener 25 (FIG. 1) is inserted through the assembled tensioner 100 and secured to the support structure 24.

The arm rotor 104 and arm 108 are in communication through the brake shoes 106 of the arm rotor 104 and the wedges 166 of the arm 108. As shown in FIG. 11A, the brake shoes 106 extend radially outward from the arm rotor 104 and abut the wedges 166 of the arm 108. This configuration operates such that as tension develops in the system, the arm rotor 104 is driven in the tensioning direction T by the spring 110. This causes the brake shoes 106 to drive the wedges 166 and therefore the arm 108 in the same direction. When the arm 108 is rotated in the winding direction W, for example due to excess tension on the belt 24, the wedges 166 of the arm 108 will act against the brake shoes 106 and cause the arm rotor 104 to rotate in the winding direction W.

In addition to communicating rotational movement between the arm 108 and arm rotor 104, the wedges 166 and brake shoes 106 serve the additional purpose of controlling and modulating a damping force as the arm is rotated in the winding direction W. As can be seen in FIGS. 7A and 11A, the wedges 166 of the arm 108 are sloped so as to drive the brake shoes 106 into the reaction drum 102 when the arm is rotated in the winding direction W. The slope of the wedges 166 serves to transfer some of the tangential force that rotates the arm 108 to a normal force which drives the brake shoes 106 against the reaction drum 102, thereby causing a damping force proportional to the normal force component.

The belt tensioner 100 therefore acts in concert with the endless power transmitting element 21 to provide tension to said element 21. As slack develops in the power transmitting element 21, the spring 110 acts against the stationary spring case 116 to drive the arm rotor 104 in a tensioning direction T. The brake shoes 106 are rotated with the arm rotor 104, acting against the wedges 166 of the arm 108, thereby resisting arm 108 motion, but with less damping friction due to the geometry of the brake shoe 106.

As slack in the power transmitting element 21 is reduced, the power transmitting element 21 acts against the pulley 114 which causes the arm to move in the winding direction W. This in turn causes the arm wedges 166 to press against the brake shoes 106. However, the action of pressing against the brake shoes 106 forces the shoes 106 against the reaction drum 102, thereby causing a frictional damping force against the rotational movement of the arm 108 and arm rotor 104.

Also disclosed is a method of providing an asymmetrical damping force to maintain a predetermined tension level in a continuous power element 21. This method consists of providing a belt tensioner 100 having: a torsional spring 110; an arm 108 having a plurality of wedges 166; a rotor 104 with brake shoes 106 pivotally attached thereto, the brake shoes 106 in physical contact with the wedges 166; and a stationary reaction drum 102 in frictional contact with the brake shoes 106, according to the arrangement described above.

As the belt 21 relieves slack, the lack of tension will allow the arm 108 of the belt tensioner 100 to move in the tensioning direction T due to the force of the torsional spring 110 against the rotor 104 which in turn biases the arm 108 towards the belt 21. This movement will generally be less inhibited due to the bias in the brake shoe 106 geometry.

When the belt 21 undergoes tension, the increased tension in the belt 21 will tend to force the arm 108 away from the belt 21 in the winding direction W. The rotational force in this direction will apply a force to the wedges 106 which will translate into a tangential force for rotating the rotor 104 and a normal force pushing the brake shoes 106 radially outward to contact the reaction drum 102. The contact between the reaction drum 102 and brake shoes 106 will create a frictional damping force which resists movement of the rotor 104 and therefore arm 108 in the winding direction W.

This arrangement is particularly useful when the belt 21 undergoes rapid or sudden changes in tension, such as when the engine 20 is idling or a device is connected to the belt 21. Sudden changes in tension will create a large force in the winding direction W which will create a large frictional damping force. This large frictional damping force will prevent the arm 108 from rapidly moving and thereby creating shutter or noise. However, the damping force will be less for movement of the arm 108 in the tensioning direction T, and therefore will maintain constant tension on the belt 21 during this operation.

By accomplishing the above, additional advantages are gained. First, since the preload torque of the coil spring is higher and for a greater elongation than an alternative flat wire or Bellville spring, a large frictional damping torque can be generated without the need for a secondary spring as required in prior art devices. The preload torque in the flat wire spring may also have a substantially flat rate that does not change as the spring is wound and unwound. This is in contrast to prior art devices, such as an axial damped tensioner with a Bellville spring, as such damping devices change drastically with deflection. Second, the friction force created by the coil spring is increased when the tensioner is wound due to a high dynamic load, but decreases when the spring is unwound, as the tensioner moves to tension the belt. Finally, the arm damping torque can be adjusted in the design stage by altering the slope on the arm wedges. This arrangement allows designers to select a preferred damping relationship by adjusting the various components.

The embodiments of this invention shown in the drawing and described above are exemplary of numerous embodiments that may be made within the scope of the appended claims. It is contemplated that numerous other configurations of the tensioner may be created taking advantage of the disclosed approach. In short, it is the applicant's intention that the scope of the patent issuing herefrom will be limited only by the scope of the allowed claims.

What is claimed is:

1. A tensioner comprising:
   a pivot shaft extending along a longitudinal axis
   a rotor mounted pivotally on said pivot shaft;
   an arm mounted pivotally on said rotor and movable in a winding direction and a tensioning direction;
   a spring for biasing said rotor about said longitudinal axis in the tensioning direction; and
   a damping assembly mounted on said arm and including:
   a reaction drum about said rotor;
   a brake shoe pivotally attached to said rotor and in frictional contact with said reaction drum; and
   a wedge extending from said arm;
   wherein said wedge bias said brake shoe against said reaction drum when said arm is moved in said winding direction to thereby increase frictional engagement between said brake shoe and said reaction drum for damping.

2. The tensioner of claim 1 wherein said spring is a torsional spring or a flat wire spring.

3. The tensioner of claim 1 wherein said brake shoe includes a high friction braking surface between said brake shoe and said reaction drum.

4. The tensioner of claim 1 wherein said wedges contact said brake shoes.

5. The tensioner of claim 4 wherein the frictional engagement in said tensioning direction is less than in said winding direction.

6. The tensioner of claim 1 wherein said arm further comprises a pulley at a distal end, said pulley for abutting an endless power transmitting element.

7. The tensioner of claim 6 wherein said spring urges said arm to tension said endless power transmitting element.

8. The tensioner of claim 1 further comprising a spring case.

9. The tensioner of claim 8 wherein said spring comprises a first end engaging said spring case and a second end engaging said rotor.

10. The tensioner of claim 9 wherein said spring includes a first hook at said first end for engaging said spring case and a second hook at said second end for engaging said rotor.

11. A tensioner for an endless power transmitting element in a drive system, the tensioner comprising:
    an arm rotatable about an axis in a winding direction and a tensioning direction, the arm having a wedge;
    a rotor rotatable about said axis, said rotor including a brake shoe mounted thereto, the brake shoe in physical contact with said wedge;
    a drum about said rotor and in frictional contact with said brake shoe;
    a torsional spring engaging said rotor and biasing said rotor in said tensioning direction;
    wherein said brake shoe acts against said wedge to turn said arm in said tensioning direction when said rotor is turned in said tensioning direction; and
    wherein when said arm is rotated in a winding direction, said wedge biases said shoe against said drum to thereby create a damping force opposing rotation of said arm in said winding direction.

12. The tensioner of claim 11 wherein said torsional spring includes a flat wire spring.

13. The tensioner of claim 11 wherein said torsional spring has a first end and a second end, said first end attached to a spring case and said second end engaging said rotor.

14. The tensioner of claim 13 wherein said rotor surrounds a pivot tube extending from the spring case, said arm and brake shoes surround said rotor, and said reaction drum surrounds said arms and brake shoes.

15. The tensioner of claim 11 wherein said torsional spring is grounded to said spring case.

16. The tensioner of claim 11 wherein said brake shoe comprises a friction lining.

17. The tensioner of claim 11 wherein said drum comprises a friction lining.

18. The tensioner of claim 11 wherein said brake shoe is pivotally mounted to said rotor.

19. The tensioner of claim 11 wherein said arm further comprises a pulley for abutting said power transmitting element.

20. A tensioner comprising:
    an arm rotatable in a tensioning direction or a winding direction about an axis, said arm having a plurality of wedges;
    a rotor rotatable about said axis, the rotor having a plurality of brake shoes contacting said wedges;
    a drum about said brake shoes and in frictional engagement with said brake shoes; and
    a spring biasing said rotor in said tensioning direction;
    wherein said brake shoes act against said wedges to allow less damping in said tensioning direction and when said arm is rotated in said winding direction, said wedges urge said brake shoes against said drum at a greater magnitude, thereby increasing frictional engagement for damping.

* * * * *